Feb. 26, 1957 C. W. EARP 2,783,305

ELECTRIC CODE MODULATION SYSTEMS OF COMMUNICATION

Filed Dec. 5, 1951 4 Sheets-Sheet 1

Inventor
C. W. EARP
By Philip M. Bolton
Attorney

Feb. 26, 1957 C. W. EARP 2,783,305

ELECTRIC CODE MODULATION SYSTEMS OF COMMUNICATION

Filed Dec. 5, 1951 4 Sheets-Sheet 2

Inventor
C. W. EARP
By Philip M. Bolton
Attorney

ELECTRIC CODE MODULATION SYSTEMS OF COMMUNICATION

Filed Dec. 5, 1951 4 Sheets-Sheet 3

Inventor
C.W.EARP
By Philip M. Bolton
Attorney

Feb. 26, 1957 C. W. EARP 2,783,305

ELECTRIC CODE MODULATION SYSTEMS OF COMMUNICATION

Filed Dec. 5, 1951 4 Sheets-Sheet 4

Inventor
C. W. EARP
By Philip M. Bolton
Attorney

United States Patent Office 2,783,305

Patented Feb. 26, 1957

2,783,305

ELECTRIC CODE MODULATION SYSTEMS OF COMMUNICATION

Charles William Earp, London, England, assignor to International Standard Electric Corporation, New York, N. Y., a corporation of Delaware Application December 5, 1951, Serial No. 260,074

Claims priority, application Great Britain December 20, 1950

8 Claims. (Cl. 179—15)

The present invention relates to electric signal communication systems of the kind in which a signal wave is sampled at frequent intervals at the transmitter, and in which information regarding some characteristic of each sample is conveyed by means of code signals to the receiver, where the signal sample is approximately reconstructed after decoding the signals.

In a code modulation system, the use of the code means that only a limited number of different values of the signal sample can be transmitted, and the sample therefore has to be quantised before the code can be set up. This means that a code modulation system can only approximately reproduce the signal wave; or in other words, distortion is in practice at present unavoidable. However, under favourable conditions, the noise picked up by the code signals in the transmission medium can be rendered substantially ineffective in the receiver, and so an improvement in signal-to-noise ratio is obtained at the cost of the introduction of signal distortion.

Experience has shown that in code modulation systems, in order that the distortion introduced shall not be excessive, the code must be capable of expressing a large number of different signal values. For example, when a binary code is used, at least six code elements or digits are usually necessary in a commercial speech communication system, in order that enough signal values may be available. Theoretically, of course, various codes other than binary codes could be used, by means of which fewer than six digits are required, but hitherto only binary codes have been proved to be realisable in practical systems.

The principal advantage gained from the use of quantising is on very long connections in which the signals are repeated a large number of times. In unquantised systems the signal-to-noise ratio increases with the number of repeater sections of the system and thus sets a practical limit to the number of repetitions which can be employed. In a quantised system, however, a certain amount of distortion is produced instead of noise in the first section, but this distortion remains the same after any number of repetitions, and so does not limit the distance over which communication is possible.

In the specification of co-pending application of Charles William Earp, Serial No. 257,807, filed November 23, 1951, a communication system is described and claimed in which information regarding a sample of a signal wave is conveyed to the receiver by two or more parameters or indices each of which represents the sample on a continuous scale. At the receiver, the signal sample is reproduced without any distortion under the control of all the indices. The distinctive feature of this system is that at least one of the indices represents the signal sample ambiguously (often all of them do); that is, any value of the ambiguous index corresponds to more than one value of the signal sample. By means of this feature, a large improvement in signal-to-noise ratio may be obtained, without the introduction of signal distortion.

The principal object of the invention is to apply the principles explained in the above mentioned specification to a quantised system and in this way a code modulation system can be produced in which a two-digit code can easily provide a larger number of signal values than is possible with a conventional six-digit binary code system, and with relatively simple apparatus.

This object is achieved according to the invention by providing an electric code modulation system of communication comprising, at a transmitter, means for periodically deriving from an intelligence wave a preliminary signal representing a characteristic of a sample of the wave, means for deriving from each preliminary signal a plurality of indices each of which represents the characteristic on a continuous scale, at least one representation being ambiguous, and means for transmitting over a communication medium in response to each index a digit signal which represents the said characteristic on a discontinuous scale.

The invention also provides a receiver for an electric code modulation system of communication for receiving a plurality of digit signals corresponding respectively to the elements of the code, each digit signal representing one of a limited number of discrete values of a given sample of an intelligence wave, at least one digit signal representing the signal sample ambiguously, comprising means for deriving from each received digit signal a corresponding train or comb of pulses, the combs having respectively different pulse repetition frequencies, means for applying all the combs of pulses to a coincidence circuit adapted to produce an output pulse in response only to the simultaneous application to the coincidence circuit of one pulse from each comb, and means for deriving an approximate but unambiguous replica of the intelligence wave from the output pulses corresponding to successive samples of the intelligence wave.

The invention will be described with reference to the accompanying drawing, in which.

In order to illustrate the invention, a pulse code modulation system will be described in which any digit value is represented by the time deviation of a pulse. For the sake of clearness, a particular case will be assumed, but it will be understood that the same principles may be applied to other cases.

It will be assumed that the system will provide 12 channels for the transmission of speech signals, each channel occupying a frequency band whose upper limit is 3 kilocycles per second. This requires a minimum sampling frequency for each channel of 6,000 times per second; but in order to facilitate separation of the signal frequencies from the sampling frequency, the latter will be taken as 10,000 times per second.

Accordingly, synchronising pulses will be transmitted at intervals of 100 microseconds, and between any pair of synchronising pulses, the code pulses of all the channels must be transmitted in their proper time positions.

It follows that the interval or period allotted to each channel will be about 8 microseconds. In the present example, the principles of the invention are applied by means of a two-digit system, and so two pulses must be transmitted during each channel period of 8 microseconds. Each of these pulses may be assumed to have a duration of about 0.1 microseconds, (though any convenient duration may be used) and in order to allow a liberal margin for imperfect phasing of the pulses, for guard intervals, and for synchronising pulse selection, a period of about 2 microseconds will be allotted for the total range of deviation of each pulse, with a gap of about 1 microsecond between the two periods.

Figures 1, 8:
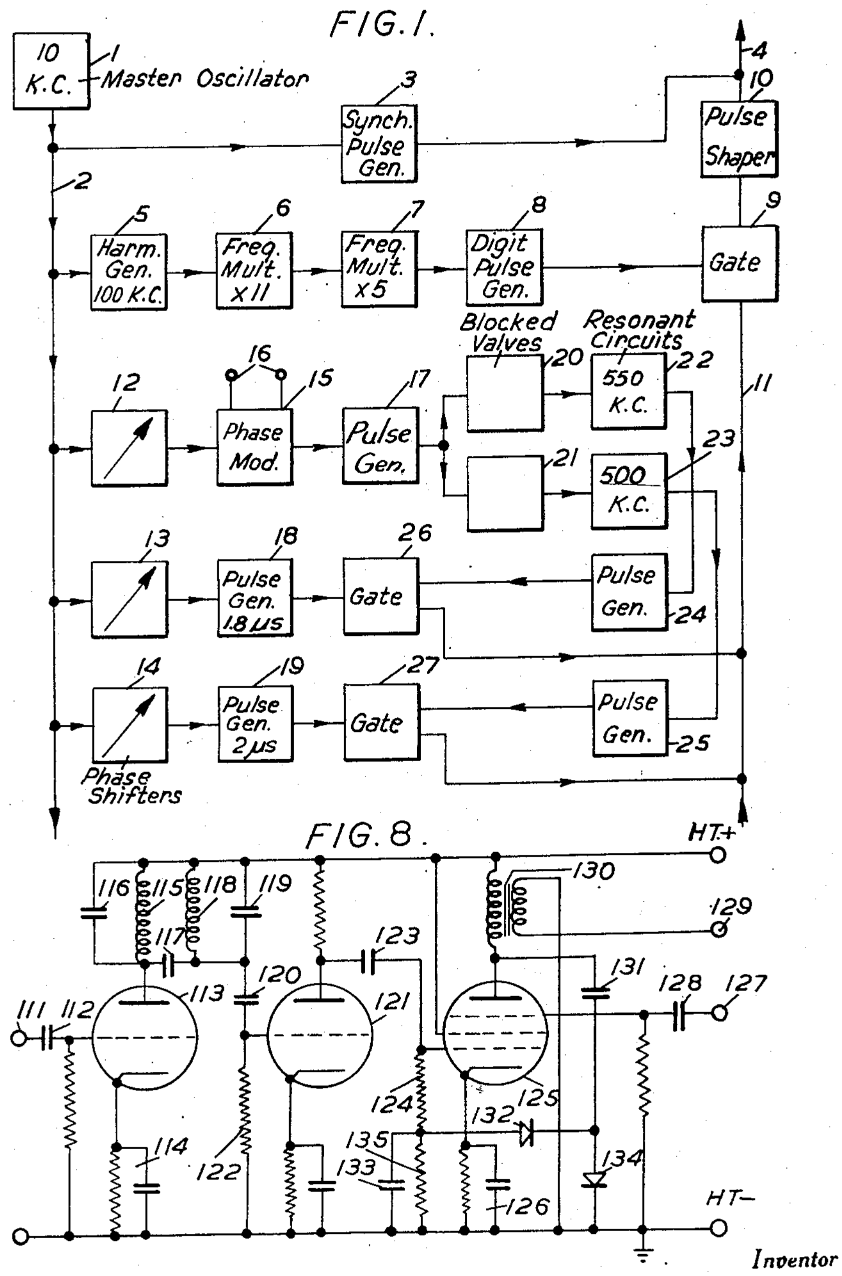
Fig. 1 shows a block schematic circuit diagram of a transmitter for a multi-channel system according to the invention.
Figs. 7 and 8 show circuit details of certain elements of Fig. 1.

Fig. 1 shows a block schematic circuit diagram of the arrangements at the transmitting end of the system. This actually shows the apparatus required for one channel only, in addition to that required for transmitting the synchronising pulses, and for generating the digit pulses, but the apparatus for all channels is identical, (except as regards certain adjustments which will be explained,) and a similar set of apparatus is provided for each channel.

Referring to Fig. 1, a master sine-wave oscillator 1 supplies waves at 10 kilocycles per second to a conductor 2 to which the equipment for each channel is connected. To the conductor 2 is also connected a synchronising pulse generator 3 of conventional type which produces a train of positive synchronising pulses of duration, for example, of 2 microseconds, by a process of squaring the master sine-wave, differentiating in order to produce pairs of positive and negative short pulses, limiting to remove negative pulses, and shaping to produce synchronising pulses of the required duration. These synchronising pulses are delivered to an output conductor 4 connected to a cable (not shown), or a radio transmitter (also not shown), or other suitable communication device.

For the purpose of generating the digit pulses, a harmonic generator 5 is connected to conductor 2 followed by two frequency multipliers 6 and 7. These elements should be designed so that a wave of frequency 5.5 megacycles per second is produced at the output of the multiplier 7. For example, the harmonic generator may be designed to produce the 10th harmonic (100 kilocycles per second) of the wave (10 kilocycles per second) from the master oscillator 1. The frequency mutipliers 6 and 7 could be designed to multiply by 11 and 5 respectively. Any equivalent arrangement could be used.

The reason for the particular choice of the frequency of 5.5 megacycles per second for the waves at the output of the multiplier 7 will be explained later. These waves are applied to a pulse generator 8 similar to 3 and designed to produce a train of very short positive digit pulses spaced apart by $\frac{2}{11}$ microsecond. These digit pulses are applied to a normally closed gating circuit 9, the output of which is connected to conductor 4 through a pulse shaper 10. The gating circuit is opened by pulses, called index pulses, supplied to conductor 11 from the channel apparatus, in order to allow certain of the digit pulses to pass to conductor 4, as will be explained more fully later.

The equipment for one channel comprises the remaining items shown in Figure 1. Elements 12, 13, and 14 are adjustable phase shifting circuits of any suitable type, the adjustment of which will be explained later. Element 15 is a phase modulator to which the corresponding channel modulating signal wave is applied at terminals 16. Elements 17, 18, and 19 are pulse generators similar to 3, each of which produces a train of pulses repeated with a mean repetition period of 100 microseconds. The pulses (which will be called "channel pulses") produced by generator 17 may conveniently be of 0.1 microsecond duration, and will be time-position modulated in accordance with the signal. The pulses produced by generators 18 and 19 are used as gating pulses, and should be of duration of about 1.8 and 2 microseconds respectively, for a reason to be explained later. These pulses will, of course, be unmodulated.

The channel pulse generator 17 is connected to two similar valves 20 and 21 biassed beyond cut-off, the arrangement being such that each pulse from the generator 17 sharply unblocks the valves, thereby shock-exciting two corresponding resonant circuits 22 and 23 connected respectively to the valves 20 and 21. These resonant circuits are tuned respectively to frequencies of 550 and 500 kilocycles per second.

The resonant circuits 22 and 23 should preferably each be designed to produce a short train of waves dying out after about 15 complete periods. These circuits are respectively connected to two further pulse generators 24 and 25 similar to 3, and from each of them is produced a short train of about 15 short positive pulses, which will be called a "comb" of pulses. The pulses in the comb from generator 24 will be repeated at intervals of 100 microseconds while those from generator 25 will be repeated at the same interval but have a duration of 1.8 microseconds. The comb of pulses from generator 24, and a gating pulse from generator 18, are applied to a gating circuit 26 in such manner that one of the pulses from the comb is selected. Similarly a comb of pulses from generator 25 and a gating pulse from generator 19 are applied to a gating circuit 27 in such a manner that one of the comb pulses is selected. These gating circuits 26 and 27 should preferably be designed to deliver to the conductor 11 positive output pulses which will be respectively called the first and second index pulses. These index pulses are applied to the gating circuit 9, and each of them selects a corresponding one of the digit pulses produced by the generator 8. The gating circuit 9 should also preferably be designed to deliver positive pulses to conductor 4.

It will be understood that a group of elements (not shown) similar to 12 to 27 will be provided for each additional channel of the system, and will be connected in the same way between conductors 2 and 11.

The operation and adjustment of the circuit of Figure 1 will be explained with respect to the diagrams of Figs. 2 and 3. In these figures each graph represents pulse amplitudes with respect to a horizontal time scale which is the same for all graphs in each figure. However, the time scale in Fig. 3 is about ten times larger than in Fig. 2 in order that the necessary detail can be clearly shown.

Figure 2:
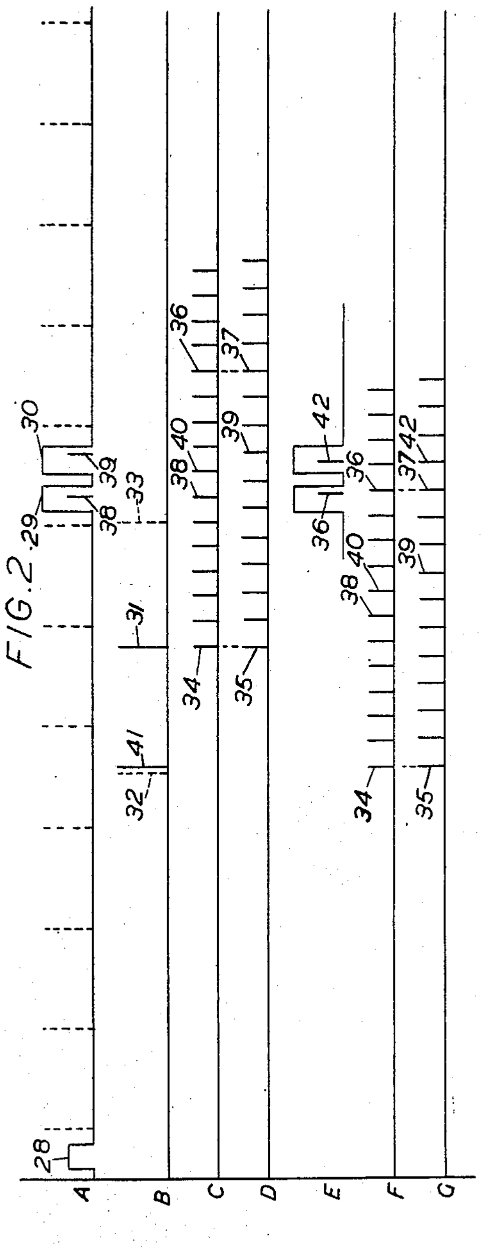
Figs. 2 and 3 show graphical diagrams used to explain the operation of Fig. 1.
Figure 3:
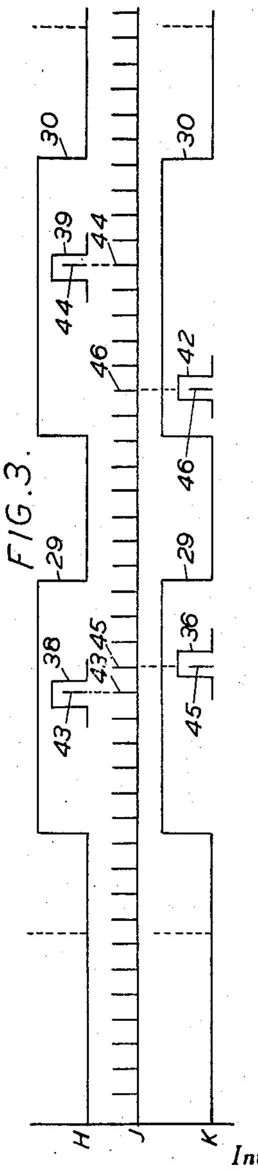

In graph A, Fig. 2, there are shown a series of channel periods each of 8 microseconds duration, separated by vertical dotted lines, preceded by a synchronising period of 4 microseconds duration occupied by a synchronising pulse 28 produced by the generator 3 of Fig. 1. It will be assumed that the channel apparatus shown in Fig. 1 is that for channel 7, and so in the seventh channel period in graph A, Fig. 2, there are shown the two gating pulses 29, 30 generated respectively by the generators 18 and 19, Fig. 1. The phase shifters 13 and 14 should therefore be adjusted so that the pulses 29 and 30 are about 1 microsecond apart, and are approximately centred in the seventh channel period. In graph B, Fig. 2, is shown the channel pulse 31 produced by the generator 17, Fig. 1, as it appears when the modulating signal voltage applied to terminal 16 of the phase modulator 15 is zero. The dotted lines 32 and 33 represent the limits of time excursion of the pulse 31 when modulated, and will be supposed to be separated by about 20 microseconds, which is about 2½ channel periods.

Graphs C and D respectively represent the combs of pulses produced by the generators 24 and 25. The initial pulses 34 and 35 of these combs are shown coinciding in time with the pulse 31, which initiates them by means of the elements 20 to 23, as already explained. Since the repetition frequencies of these combs are 550 and 500 kilocycles per second respectively, the twelfth pulse 36 of the first comb will also coincide with the eleventh pulse 37 of the second comb, just 20 microseconds later. These coincidences are indicated by vertical dotted lines connecting the coinciding pulses.

Now the gating pulse 29 and the comb, graph C, are applied to the gating circuit 26 of Fig. 1, and accordingly only a single one of the pulses of this comb, namely pulse 38, will be selected and transmitted to conductor 11. Similarly, the gating pulse 30 and the comb, graph D, are applied to the gating circuit 27, and the single pulse 39 of this comb will be selected.

It will be apparent that as phase shifter 12 (Fig. 1) is adjusted, the pulse 31 and both the combs of graphs C and D will be shifted bodily along the time axis. The adjustments should be such that the pulses 38 and 39 selected by the gating pulses 29 and 30 are each roughly at the centre of the corresponding comb. This adjustment does not need to be very accurate.

It will be clear that the duration of the gating pulse 29 should be equal to the repetition period of the comb C, namely about 1.8 microseconds, while the duration of the gating pulse 30 should similarly be 2 microseconds. The pulses 38 and 39 are the index pulses already mentioned, and have been shown also in graph A inside the corresponding gating pulses 29 and 30.

Now if the channel pulse 31 is modulated and begins to move to the left, the combs will move with it, and the index pulse 38 will approach the left-hand edge of the gating pulse 29. When it reaches this edge it will disappear, but will be replaced by the next pulse 40 which just appears inside the right-hand edge of the gating pulse 29. Similarly for the pulse 39 and the gating pulse 30. Thus the time position of each transmitted index pulse indicates by itself several possible time positions of the channel pulse 31. From the position of the two index pulses together, however, the ambiguity is resolved in the receiver, as will be explained later.

It will be clear that the duration of each gating pulse should ideally be just equal to the corresponding comb repetition period. However, such a critical adjustment could not be maintained, and so it is preferable to make the duration of the gating pulse slightly greater, in which case occasionally an extra pulse might be selected. This is not really material if suitable arrangements are used at the receiver, but as will be explained, the gate circuit 26 or 27 can be designed to suppress the extra index pulse.

In Fig. 2 the two gating pulses 29 and 30 have been repeated in their original time positions in graph E, and graphs F and G show the two combs as they appear when the pulse 31 is shifted by modulation to the position 41 which is close to the "early" excursion limit 32. It will be now seen that the gating pulses 29 and 30 select two later index pulses from the combs, one of which happens in this case to be the pulse 36 shown in graph C, and the other is designated 42. These pulses appear in the gating pulses 29 and 30 in new relative positions as indicated in graph E, and from these new positions, the position of the pulse 41 can be inferred. It will be evident that if the channel pulse 31 shifts close to the "late" excursion limit 33, the combs will be likewise shifted to later positions, and the gating pulses 29 and 30 will select two other pulses from near the beginning of each comb.

In Fig. 3 graph H shows to a much larger time scale the seventh channel period of graph A with the gating pulses 29 and 30 and the index pulses 38 and 39 selected thereby shown with approximately correct time relations. Graph J shows the train of digit pulses produced by the generator 8, Fig. 1, and supplied thereby to the gating circuit 9. Graph K shows the gating pulses 29 and 30 repeated to the same large scale, with the index pulses 36 and 42 selected thereby, also in the correct relative time positions.

Since the repetition frequencies of 550 and 500 kilocycles per second have been chosen for the repetition frequencies of the pulses of the two combs shown in graphs C and D, Fig. 2, it will be seen that the repetition periods differ by $\frac{2}{11}$ microsecond. It is for this reason that the repetition frequency of the digit pulses shown in graph J, Fig. 3, has been chosen to be 5.5 megacycles per second, whereby they will have a repetition period of $\frac{2}{11}$ microsecond. For the same reason, the duration of the index pulses produced by the generators 24 and 25 should slightly exceed $\frac{2}{11}$ microsecond. It will be clear that the period separating any pulse of one comb from any pulse of the other must be an exact integral multiple of $\frac{2}{11}$ microsecond, and therefore since the two index pulses 38 and 39 shift in time together, the particular digit pulse selected by each of them is changed at the same time. This condition is necessary in order to avoid an incomplete change in the code represented by the digit pulses which would produce serious distortion.

The digit pulses shown in graph J should evidently be of very short duration—for example about 0.02 microsecond. However, once the digit pulses have been selected, they may be lengthened to a suitable duration for transmission, for example, 0.1 microsecond, and for this purpose the pulse shaper 10 has been shown in Fig. 1. Nevertheless, if it is convenient to transmit the digit pulses unaltered, the pulse shaper 10 may be omitted.

Referring now to the graphs of Fig. 3, the index pulses 38 and 39 have been shown as selecting two digit pulses 43 and 44 separated by 17 digit pulse periods, and the respective time positions of these two digit pulses provide the code signal from which the time position of the channel pulse 31 (graph B, Fig. 2) can be approximately reproduced at the receiver. Likewise the index pulses 36 and 42 (graph K, Fig. 3) respectively pick out the digit pulses 45 and 46 separated by 11 digit pulse periods, and the respective time positions of these two digit pulses provide the code signal from which the time position of the channel pulse 41 (graph B, Fig. 2) can be approximately reproduced at the receiver.

The channel apparatus for all the other channels operates in like manner, the only difference being that the phase shifters 13 and 14 (Fig. 1) will be adjusted to bring the gating pulses similar to 29 and 30 into the corresponding channel period, and the pulse shifter 12 will be adjusted accordingly to centre the combs with respect to the gating pulses, as explained. It follows that from the circuit of Fig. 1 will be transmitted a repeated series of pulses, each series consisting of a synchronising pulse followed by twelve pairs of digit pulses, each pair forming the code corresponding to a sample of the signal wave of one of the channels.

Figures 4, 6:
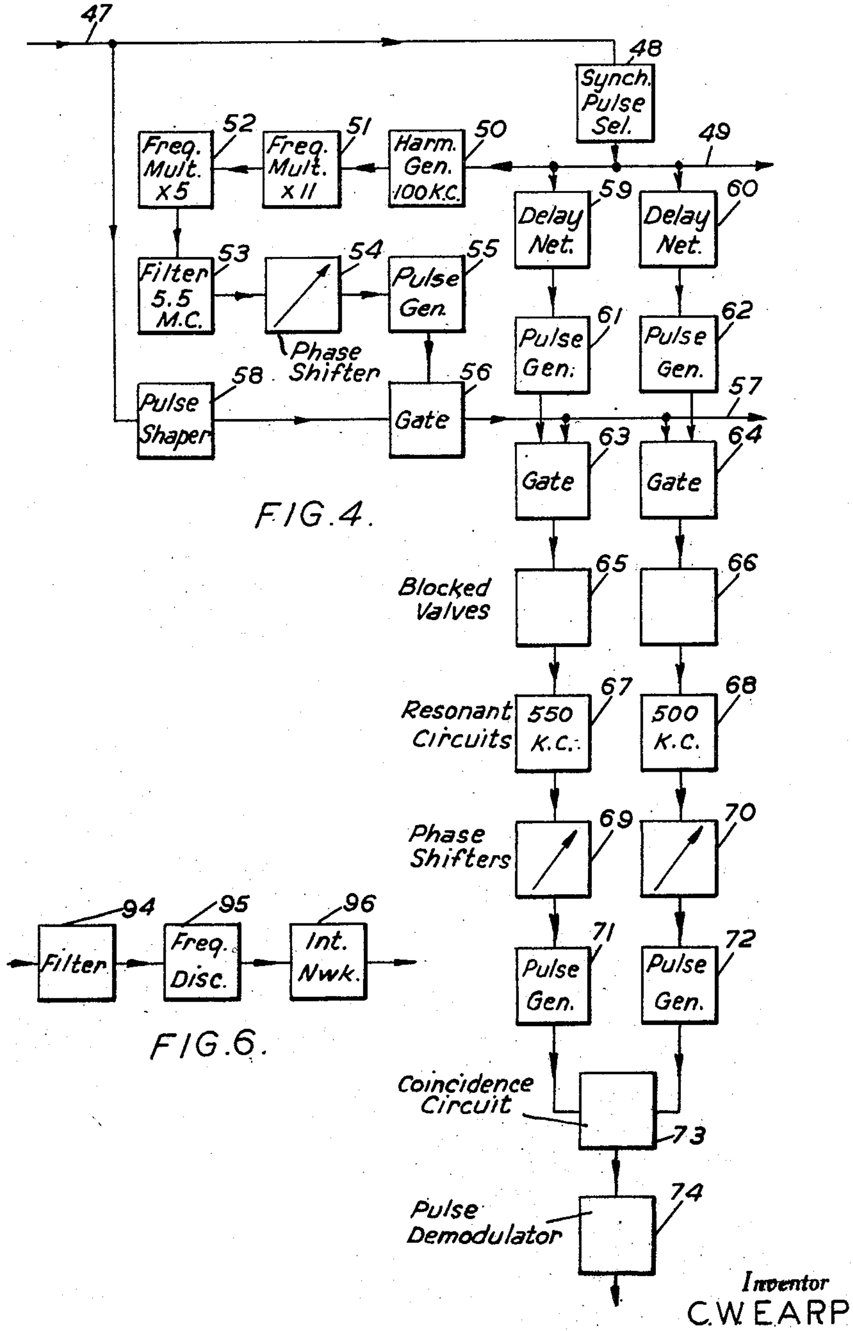
Fig. 4 shows a block schematic circuit diagram of a receiver for the system.
Fig. 6 shows details of an element of Fig. 4.

Fig. 4 shows a circuit for receiving and demodulating the digit pulses produced by Fig. 1. Only the apparatus for one channel is shown, all the remaining channels being similarly equipped. The pulses after demodulation from the carrier wave (if any) are delivered over conductor 47 to a synchronising pulse selector 48, of conventional type, which selects the synchronising pulses 28 (Fig. 2, graph A), and delivers them to a conductor 49 connected to a harmonic generator 50 similar to 5, Fig. 1. This produces the tenth harmonic of the synchronising pulse repetition frequency of 10 kilocycles per second and this harmonic is multiplied up to 5.5 megacycles per second by two frequency multipliers 51 and 52, similar respectively to 6 and 7, Fig. 1. The waves at 5.5 megacycles per second produced by the multiplier 52 are passed through a filter 53 sharply tuned to 5.5 megacycles to remove substantially the effects of noise picked up by the synchronising pulses. The filtered waves are passed through a phase shifter 54 to a pulse generator 55 similar to 8, Fig. 1, which produces a train of very short code pulses of duration 0.02 microsecond, similar to the digit pulses shown in graph J, Fig. 3. These code pulses are supplied through a normally closed gating circuit 56 to a conductor 57.

The train of pulses received over conductor 47 is applied to a pulse shaper 58 designed to give the received digit pulses a definite duration of perhaps 0.1 microsecond, which are then applied as gating pulses to the gating circuit 56. The phase shifter 55 should be adjusted so that each selected code pulse is centred on the corresponding gating pulse.

The reason for this arrangement is that the digit pulses will pick up some noise which it is desirable substantially to remove, and this is done by producing the substantially noise-free code pulses, and picking out one corresponding to each of the received digit pulses. The duration of the gating pulses derived from the received digit pulses should therefore be at least double the maximum time shift of the digit pulses produced by noise, so that in every case the proper code pulse will always be selected without having any noise transferred to it.

The synchronising pulse selector 48 delivers the synchronising pulses also through two adjustable delay networks 59 and 60 to two pulse generators 61 and 62 similar respectively to 18 and 19 (Fig. 1) for producing gating pulses similar respectively to 29 and 30 (Fig. 2). The pulse generators 61 and 62 are connected respectively to two gating circuits 63 and 64, to each of which is also connected the conductor 57 over which the gating circuit 56 supplies the code pulses corresponding to the first and second digit pulses of each channel. The first and second code pulses respectively selected by the gating circuits 63 and 64 are respectively applied to blocked valves 65 and 66 for shock-exciting two corresponding resonant circuits 67 and 68, tuned respectively to 550 and 500 kilocycles per second. The short trains of waves so produced are applied through phase shifters 69 and 70 to pulse generators 71 and 72 for producing two corresponding combs of pulses similar to those produced in the circuit of Fig. 1. The elements 65 to 68 and 71, 72 may be similar respectively to the elements 20 to 25 of Fig. 1.

The two combs of pulses are simultaneously applied to a coincidence circuit 73 from the output of which is obtained a single pulse having the same degree of time modulation as the original channel pulse 31 (Fig. 2). The coincidence circuit 73 may be a valve gating circuit similar to 26 and 27 (Fig. 1) which gives an output pulse only when it receives two simultaneous input pulses. The pulses from the coincidence circuit 73 are then applied to a demodulator 74 from the output of which an approximate replica of the original modulating signal wave is obtained. The demodulator should preferably be of the type employing a frequency discriminator for a reason which will be explained later.

The elements 59 to 74 will be duplicated for each channel, and the connections of the additional apparatus will be made in the same way to conductors 49 and 57.

The delay networks 59 and 60 should be adjusted so that the gating pulses produced by the generators 61 and 62 are spaced from the received synchronising pulse by the same times as the pulses 29 and 30. (Fig. 2 graph A) are spaced from the synchronising pulse 28.

Figure 5:
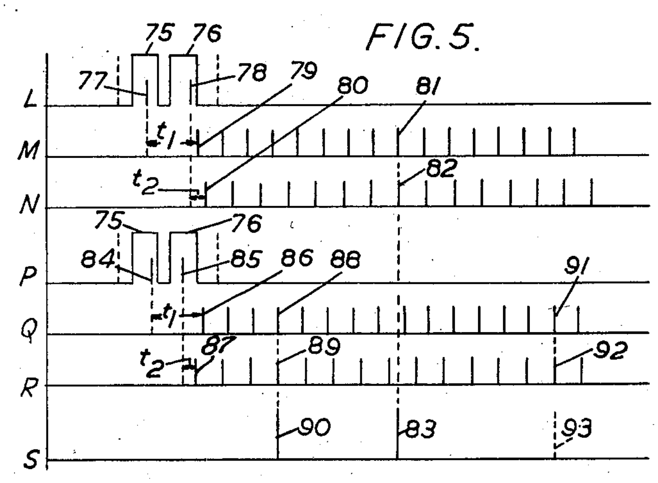
Fig. 5 shows graphical diagrams used to explain the operation of Fig. 4.

The method of recovering the signal wave from the code pulses will be explained with reference to Fig. 5, which shows graphs of pulses with reference to the same time scale as the graphs of Fig. 2. In Fig. 5 graph L, shows the gating pulses 75, 76, produced by the gating pulse generators 61 and 62, placed in the seventh channel period. The earlier channel periods are not shown.

In the explanation which follows, the transmission delay which occurs in the communication medium and circuits, and which affects all pulse equally, will be neglected. When it is stated that events occur "at the same time" at both ends of the system, it will be understood that the times really differ by the constant transmission delay.

The two code pulses 77 and 78 will be received at the times indicated in graph L, Fig. 5. After selection by the gating circuits 63 and 64 these pulses will initiate two combs of pulses shown in graphs M and N. The initial pulses 79 and 80 of these combs will be delayed after the corresponding pulses 77 and 78 according to the adjustment of the phase shifters 69 and 70. The corresponding delays are indicated as $t_1$ and $t_2$. These times should be adjusted by means of the phase shifters

69 and 70 so that when the channel pulse 31 (graph B, Fig. 2) is unmodulated, a coincidence occurs between two pulses 81 and 82 each of which is approximately at the centre of the corresponding comb. The significant point is that this coincidence is determined by the difference $t_1-t_2$ and so the actual values chosen for $t_1$ and $t_2$ are not critical provided that their difference has the necessary value.

Now it will be evident that while the combs shown in graphs C and D, Fig. 2 move smoothly along the time axis with the channel pulse 31, the combs shown in graphs M and N will move in discontinuous steps because the code pulses 77 and 78 also move in steps. Referring to graph H, Fig. 3, the digit pulses 43 and 44 will each be delayed after the channel pulse 31 by the same small time $t_0$. Hence if the combs shown in graphs C and D, Fig. 2, were delayed respectively by the times $t_1+t_0$ and $t_2+t_0$, their later pulses would coincide with the pulses of the combs shown in respectively graphs M and N, Fig. 5. Thus the coincidence between pulses 81, 82 will be at a time and later than the channel pulse 31, where $T=t_2+t_0+14$ microseconds (there being 7 periods of 2 microseconds between the pulses 80 and 82 of the comb shown in graph N). When the channel pulse 31 starts to move along the time axis, the combs shown in graphs M and N remain stationary until the index pulses 38 and 39 (graph H, Fig. 3) each pick out the adjacent digit pulse, when both the combs suddenly advance together by a step equal to $\frac{2}{11}$ microsecond (equal to the period of the digit pulse train, graph J). Thus the coincidence 81, 82 follows the movement of the channel pulse 31 in steps, the maximum timing error being $\frac{1}{11}$ microsecond.

The pulses 81 and 82 are applied to the coincidence circuit 73 (Fig. 4) and produce a corresponding output pulse 83 (graph S, Fig. 5) which therefore follows the channel pulse 31 in steps of $\frac{2}{11}$ microsecond.

In graph P, Fig. 5, the gating pulses 75 and 76 are again shown in the same position, having picked out the first and second code pulses 84 and 85 corresponding to the channel pulse 41 (Fig. 2, graph B). The corresponding combs produced by the pulse generators 71 and 72 (Fig. 4) are shown in graphs Q and R. The initial pulses 86 and 87 of these combs are respectively spaced from the code pulses 84 and 85 by the constant times $t_1$ and $t_2$ as before. The coincidence now occurs between two earlier pulses 88 and 89 producing a corresponding output pulse 90 (graph S).

The deviation of the output pulse 90 will be within $\frac{2}{11}$ microsecond of the deviation of the channel pulse 41. It should be pointed out that there will be a second coincidence between pulses 91 and 92 of the combs shown in graphs Q and R, and this would produce a second output pulse (shown dotted at 93 in graph S) from the coincidence circuit 73. The pulse 93 will be exactly 20 microseconds later than the pulse 90, but its presence will be immaterial if a suitably tuned discriminator is used for demodulating the output pulses. If desired, however, the coincidence circuit 73 may be designed to suppress the pulse 93.

The duration of the pulses of the combs produced by the generators 71 and 72 should be less than the difference between the repetition periods of the two combs (which is $\frac{2}{11}$ microsecond), otherwise multiple coincidences between pulses of the two combs will be produced. A duration of 0.1 microsecond for these pulses would be suitable, but subject to the limitation stated above, any convenient duration may be chosen.

A consideration of Fig. 2 will show that if occasionally two adjacent index pulses are admitted by one of the gating pulses 29 or 30 at the transmitting end, the effect at the receiving end will be negligible. All that will happen is that the corresponding resonant circuit 67, or 68 (Fig. 3) will be shock-excited a second time in the same phase. This will increase the amplitude of the train of waves so produced, but the resulting pulse comb (graph C or D, Fig. 2) will be unaffected.

It has been stated that the number of pulses in each of the combs should be about 15. The actual number is not critical, but the number should be such that the total duration of the comb exceeds by a reasonable margin the sum of the total time excursion of the channel pulse 31 and the time occupied by the two gating pulses 29, and 30. Thus in the present example, the duration of the pulse comb should exceed 20+5=25 microseconds. Fifteen pulses of the comb, graph D, occupy 28 microseconds which gives a safe margin.

It is desirable to explain at this point that although the initial pulses 34 and 35 of the combs, graphs C, and D, Fig. 2, have been shown for simplicity as coinciding in time with the channel pulse 31, in practice there will not generally be an exact coincidence, because the first pulse produced by each of the resonant circuits 22 and 23 (Fig. 1) will be delayed slightly after the channel pulse 31, and the initial pulses 34 and 35 will not exactly coincide with one another because the periods of the two resonant circuits are different.

It is desirable that these pulses should be brought into coincidence in order that the index pulses 38 and 39 (graph H, Fig. 3) may be separated by an integral number of digit pulse periods for the reasons already mentioned. The necessary adjustment will be very small and can be carried in the pulse generator 24 or 25 (Fig. 1) as will be mentioned later.

It is desirable also to point out that the maximum range of time displacement of the channel pulse 31 (Fig. 2, graph B) is equal to the coincidence period of the two pulse combs, which with the particular numerical values chosen above is 20 microseconds. If this range is exceeded, an ambiguity of one or more coincidence periods is introduced. Furthermore, the expansion, that is, the ratio of the time displacement of the channel pulses to that of the index pulses, is given by the number of comb pulse periods in the coincidence period. Thus in the case assumed above, the expansion is 10. If the frequencies chosen for the two resonant circuits are respectively $F_1$ and $F_2$, the expansion is $F_1/(F_2-F_1)$, and the maximum range of time displacement of the channel pulse is $1/(F_2-F_1)$. Thus the frequencies $F_1$ and $F_2$ should be chosen to suit the conditions to be met by the system.

It will be evident that the receiving arrangements which have been described with reference to Fig. 4 are exactly the same as those described with reference to Fig. 3 of the specification of co-pending application of Charles William Earp, Serial No. 257,807, filed November 23, 1951, but it operates on a pair of code pulses each of which has a limited number of discrete time positions, instead of on a pair of index pulses each having a continuous range of time positions.

It should be pointed out that since about 10 pulses are available in each comb, and since each index pulse selected from a comb can pick out one of about 10 digit pulses, the code provides for about 110 quantising steps. If a binary code were used 7 digits would be necessary to provide the same facilities, and this would require very complex coding and decoding arrangements. It is to be noted that in the arrangement according to the invention, the number of available steps could be changed very simply: for example, if the repetition frequency of the digit pulses were doubled, the number of available quantising steps would be also doubled. Furthermore, the number of pulses available in the pulse combs could be other than 15, and different repetition frequencies could be chosen for the pulses of these combs.

Fig. 6 shows a block schematic circuit of the preferred form of the demodulator 74 of Fig. 4. It consists of a band pass filter 94 for selecting a harmonic of the repetition frequency (10 kilocycles per second) of the output pulses, followed by a frequency discriminator 95 of any conventional type, at the output of which will be obtained the differential of the signal wave (since the original channel pulse 31, Fig. 2, was effectively phase modulated). To obtain the signal wave itself the discriminator 95 is followed by an integrating network 96, according to well known practice. This method of demodulating position modulated pulses is described in British patent specification No. 581,005, issued December 24, 1946.

The harmonic selected by the filter 94 should preferably be the fifth harmonic (50 kilocycles per second) since in this case the extra pulses due to repeated coincidences of the combs at the receiver already referred to will have no undesirable effect.

The discriminator 95 may for example be of the Foster-Seeley type illustrated in Fig. 52*a* on page 586 of the Radio Engineer's Handbook by F. E. Terman, 1st edition, 1943. Since such a discriminator generally includes tuned circuits, which can be used for selecting the desired harmonic, the filter 94 may not be required.

Although the code employed in the system according to the invention which has been described, is a two-digit code, arrangements may be made for three or more digits if required. It is explained in the specification of co-pending application of Charles William Earp, Serial No. 257,807, filed November 23, 1951 that any number of ambiguous indices may be used, and it is only necessary to use the indices so produced to gate a train of digit pulses, as already described.

Thus for three or more digits it is only necessary to add to Fig. 1 a set of elements (not shown), corresponding to 13, 18, 20, 22, 24 and 26 for each additional digit, there will of course be additional gating pulses (not shown) similar to 29 and 30, Fig. 2, graph A, and the duration and separation of these gating pulses must be adjusted so that they fit into the channel period with reasonable margins. In the receiver (Fig. 4) the elements 59, 61, 63, 65, 67, 69 and 71 will be duplicated for each digit, and the coincidence circuit 73 will be designed to operate only on the simultaneous receipt of one pulse from each comb.

In such cases the repetition period of the digit pulses and the duration of the index pulses should be chosen equal to the highest common factor of the pulse periods of the respective combs.

Figure 7:
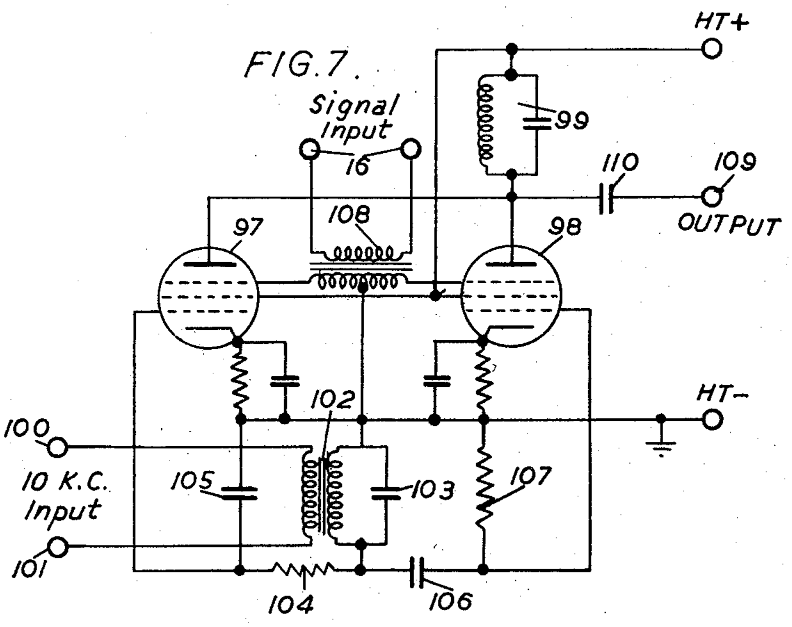

Fig. 7 shows details of the preferred form of the phase modulator 15 shown in Fig. 1. It is of a known type comprising two pentode valves 97 and 98 having in common an anode load comprising a parallel resonant circuit 99 tuned to the frequency of the master oscillator 1 (10 kilocycles per second). The phase shifter 12 should be connected to the input terminals 100, 101 of the modulator, which terminals are connected to an input transformer 102 tuned to 10 kilocycles per second by the capacitor 103. The secondary winding of this transformer is connected between ground and the control grids of the valves 97 and 98, phase shifting networks comprising respectively the resistor 104 and capacitor 105, and the capacitor 106 and resistor 107 being interposed, whereby the phase of the waves applied to these grids is shifted by plus or minus 45° respectively.

The terminals 16 for the modulating signal wave are connected to a transformer 108 having a secondary winding which is connected between the suppressor grids of the two valves, and which has a centre tap connected to ground. The output phase modulated waves are obtained from a terminal 109 connected to the anodes of the valves through a blocking capacitor 110.

The circuit operates in the following way. Equal and opposite signal voltages are applied to the suppressor grids of the valves, and this increases the anode current of one valve and decreases that of the other. The output alternating current is resultant of two currents in quadrature, one of which is decreased by the signal voltage and the other increased. The phase of the output current therefore varies in accordance with the signal voltage.

Fig. 8 shows details of the elements 20, 22, 24 and 26, of Fig. 1 combined in a single circuit. Elements 21, 23, 25 and 27 would be similar. In Fig. 8 the pulses from the generator 17 (Fig. 1) are applied to an input terminal 111 which is connected through a capacitor 112 to the control grid of a valve 113 which is normally blocked by cathode bias produced by the network 114. Connected in series with the anode circuit of valve 113 is a parallel resonant circuit comprising an inductor 115 and a capacitor 116. This resonant circuit is coupled through a capacitor 117 to a second similar parallel resonant circuit comprising an inductor 118 and a capacitor 119.

The two parallel resonant circuits should both be tuned to the same frequency, which will be near to 550 kilocycles per second, and should be such that the combination forms a narrow band-pass filter, with the band centred on 550 kilocycles per second.

The elements 115 to 119 may be so designed that when shock-excited by the sudden unblocking of the valve 113 by a positive pulse from the generator 17 (Fig. 1), a train of output waves is produced, the amplitude of which expands uniformly from zero, and then contracts again. This condition may be obtained by choosing the value of the capacitor 117 so that critical coupling is produced between the two resonant circuits whereby they constitute substantially a band-pass filter with a "flat topped" frequency characteristic. By suitable choice of the resonance frequency and the damping factors of the resonant circuits, each shock excitation may be made to produce a short train of waves with about 15 positive and 15 negative loops of appreciable amplitude.

The elements 116 and 119 make up the resonant circuit 22 of Fig. 1, and the circuit 23 will be the same, except that the two parallel resonant circuits should be tuned near to 500 kilocycles per second in order to produce a narrow band-pass filter, with the band centred to 500 kilocycles per second.

It may be added that the resonant circuits may be constituted by various forms of filter circuits or other resonant networks. Thus the term "resonant circuit" should therefore be understood to include any appropriate network of this sort.

The train of output waves from the resonant circuit is applied through an adjustable capacitor 120 to the control grid of a limiting valve 121. This grid is connected to ground through an adjustable resistor 122. The elements 120 and 122 provide the means whereby a slight phase adjustment may be made to bring into coincidence the initial pulses 34 and 35 of the two combs, graphs C and D, Fig. 2, as already explained above. The limiting valve 121 should be so biassed and arranged that there are produced at the anode a series of about 15 positive and 15 negative rectangular waves or pulses according to the well known "squaring" technique. These waves are differentiated by the capacitor 123 and resistor 124 to produce about 15 pairs of short positive and negative differential pulses which are applied to the control grid of the gating valve 125 normally biassed beyond the cut-off by the cathode bias network 126. The negative differential pulses have no effect on the gating valve, and the 15 positive differential pulses constitute the comb illustrated in graph C, Fig. 2. Gating pulses from the generator 18 (Fig. 1) are also applied to terminal 127 and through the blocking capacitor 128 to the suppressor grid of the gating valve, thus permitting one of the positive comb pulses to pass from the anode to the output terminal 129 through the output transformer 130. This output pulse is then the corresponding index pulse, and the transformer 130 should be connected so that the index pulse is positive.

In order to prevent the gating valve from responding to a second comb pulse (which might otherwise be selected in circumstances explained above), the anode of the valve 125 is connected through a capacitor 131 and a rectifier 132 to the capacitor 133 connected in series between the resistor 124 and ground. The leading edge of an output index pulse (which will be negative-going because of the inversion through the gating valve) charges the capacitor 133 negatively, thereby increasing the grid bias so that the valve 125 will not respond to the following comb pulse. A second rectifier 134 connects the capacitor 131 to ground, and provides a low resistance path for the positive-going trailing edge of the index pulse. The resistor 135 shunting the capacitor 133 should be chosen so that the corresponding time constant is large compared with the repetition period of the comb (2 microseconds) but small compared with the repetition period of the channel pulses (100 microseconds), so that the condenser 133 will be substantially discharged by the time the next channel pulse arrives at terminal 111.

The elements 131 to 135 are, however, not essential, and could be omitted.

The coincidence circuit 73 (Fig. 3) can be arranged in just the same way as the valve 125, and if the additional output pulse corresponding to the extra coincidence referred to above is to be eliminated, elements similar to 131 to 135 may be provided. The time constant of the elements 133, 135 should however be chosen to be large compared with the coincidence period (20 microseconds). When three or more indices are employed, the coincidence circuit 73 could consist of a train of two or more valves arranged similarly to 125 for producing the multiple coincidences, and only the last of them need be provided with the suppressing elements 133 to 135.

It may be added that, if desired, an additional resistor (not shown) may be connected between the cathode of each of the valves 113, 121 and 125 and the positive high tension terminal in order more definitely to fix the cathode potential.

The gating circuits 9 (Fig. 1) and 56 (Fig. 4) could also each comprise in valve arranged similarly to 125 (Fig. 8), but the elements 131 to 135 would not be required.

It should be pointed out that the embodiment described with reference to Figs. 7 to 9 of the specification of co-pending application of Charles William Earp, Serial No. 257,807, filed November 23, 1951 could also be adapted in the manner described with reference to the accompanying Figs. 1 and 4. The two indices which are normally transmitted can be used to gate a digit pulse train by means of elements arranged similarly to elements 5 to 9 of Fig. 1; and in the receiver the received digit pulses may be used to gate a code pulse train by means of elements arranged similarly to 50 to 56 of Fig. 4.

The embodiment described with reference to Figs. 20 to 22 of the specification of co-pending application of Charles William Earp, Serial No. 257,807, filed November 23, 1951 may also be adapted on similar lines, except that since at the transmitter the two digit pulses corresponding to each channel must now be capable of separate identification, two trains of digit pulses must be provided, one consisting of positive pulses and one of negative pulses, and two gating circuits to enable positive index pulses to gate one train of digit pulses, and negative index pulses to gate the other train of digit pulses. The selected digit pulses are then treated in the same manner as the index pulses which they respectively replace. At the receiver also, two trains of code pulses and two gating circuits are necessary, and are operated on the same lines as at the transmitter.

The embodiments of the invention in which an exclusive property or privilege is claimed are defined as follows:

1. In an electric communication system, means for producing a series of pulses time modulated in accordance with a signal wave, means for producing from each of said time modulated pulses a plurality of wave trains having frequencies different from one another, means for selecting a pulse intermediate the ends of each of said trains to serve as an index pulse, means for producing a separate train of pulses, a gate, means for applying said pulses last mentioned and the selected pulses to said gate to produce output pulses, and means for transmitting said output pulses.

2. In an electric communication system, means for coding a signal wave for transmission comprising means for periodically sampling the signal wave, means for deriving from each sample a first index representative of the value of said sample in terms of a first scale, means for deriving from said sample a second index representative of the same value of said sample in terms of a second scale, said second index being different from but related to said first index, means for generating regularly repeated short pulses, the repetition period being small compared with the period at which said signal wave is sampled, means for causing said indices to select corresponding ones of said short pulses, and means for transmitting the pulses so selected.

3. In an electric communication system, means for periodically sampling a signal wave, means for deriving from each sample a plurality of time modulated index pulses each of which represents said sample according to a different scale and the time modulation excursion of which is confined to a given period, means for generating a train of pulses having a repetition period which is small compared with said given period, means for causing each of said index pulses to select from said train of pulses a pulse the time position of which closely corresponds to that of said index pulse, and means for transmitting the pulses so selected.

4. In an electric communication system, means for producing a first wave, means for phase modulating said wave in accordance with a signal, means for converting the resulting modulated wave into a series of correspondingly time modulated pulses, means for producing from each of said pulses two trains of pulses one of said trains having a different frequency from the other, first gating means for selecting a pulse from each of said trains, means for creating a series of pulses the repetition period of which is small compared with the maximum time modulation excursion of said pulses first mentioned, a further gating means, means for applying said series of pulses and said selected pulses to said further gating means to select pulses from said series of pulses, and means for transmitting the selected pulses last mentioned.

5. In an electric communication system, means for producing a series of pulses time modulated in accordance with a signal wave, means for producing from each of said time modulated pulses a plurality of pulse trains having frequencies different from one another, means for selecting a pulse intermediate the ends of each of said trains to serve as an index pulse, means for producing a separate train of pulses, the repetition period of the pulses of said separate train being small compared with the maximum time modulation excursion of said pulses first mentioned, a gate, means for applying said pulses last mentioned and said selected pulses to said gate to produce output pulses, and means for transmitting said output pulses.

6. In an electric communication system, means for producing a first wave, means for phase modulating said wave in accordance with the signal, a first pulse generator to produce from said wave a series of time modulated pulses, a first blocked valve and a first resonant circuit connected thereto, means for applying said pulses to said valve to cause said resonant circuit to produce a wave train, a second pulse generator, means for applying said wave train thereto to produce a second series of pulses, a first gate, means for passing said pulses last mentioned to said first gate, a second blocked valve, means for applying pulses from said first pulse generator to said second valve, a second resonant circuit having a frequency different from said first resonant circuit, a third pulse generator and a second gate connected similarly to the corresponding elements already mentioned to produce a third series of pulses, gating pulse generators for applying to said first gate and to said second gate gating pulses correspondingly related to the frequencies of said first and said second resonant circuits, a third gate, means for applying output pulses from said first and second gates to said third gate, a final pulse generator producing pulses at a repetition period at least as great as the width of the output pulses from said first and second gates, means for applying said pulses from said final generator to said third gate to produce output pulses, and means for transmitting said output pulses.

7. In an electric communication system, means for producing a series of pulses time modulated in accordance with a signal wave, means for producing from each of said time modulated pulses a plurality of pulse trains having frequencies different from one another, means for selecting a pulse intermediate the ends of each of said trains to serve as an index pulse, means for producing a separate train of pulses, the repetition period of the pulses of said separate train being small compared with the maximum time modulation excursion of said pulses first mentioned, a gate, means for applying said pulses last mentioned and said selected pulses to said gate to produce output pulses, means for transmitting said output pulses, and a receiver for receiving pulses so transmitted, comprising means for producing periodically repeated pulses, a gating circuit, means for applying the received signal pulses and said periodically repeated pulses to said gating circuit to gate a secondary pulse in response to each signal pulse, two further gating circuits, means for applying said secondary pulses and additional locally generated gating pulses to said further gating circuits to gate a selected pulse in response to each secondary pulse, means for deriving from each selected pulse a corresponding train of locally generated pulses, said trains having different pulse repetition frequencies, related to the frequencies of said pulse trains first mentioned, a coincidence circuit adapted to produce an output pulse in response only to simultaneous application thereto of one pulse from each train of pulses, and means for applying said trains of pulses to said coincidence circuit to produce output pulses representing said signal sample.

8. A receiver for receiving a plurality of quantized signal pulses each of which represents to a different scale the same original signal sample, comprising means for producing periodically repeated pulses, a gating circuit, means for applying the received signal pulses and said periodically repeated pulses to said gating circuit to gate a secondary pulse in response to each signal pulse, two further gating circuits, means for applying said secondary pulses and additional locally generated gating pulses to said further gating circuits to gate a selected pulse in response to each secondary pulse, means for deriving from each selected pulse a corresponding train of locally generated pulses, said trains having different pulse repetition frequencies related to the frequencies of said pulse trains first mentioned, a coincidence circuit adapted to produce an output pulse in response only to simultaneous application thereto of one pulse from each train of pulses, means for applying said trains of pulses to said coincidence circuit to produce output pulses representing said signal sample.

References Cited in the file of this patent

UNITED STATES PATENTS

| | | |
|---|---|---|
| 2,438,908 | Goodall | Apr. 6, 1948 |
| 2,530,538 | Back | Nov. 21, 1950 |
| 2,547,001 | Grieg | Apr. 3, 1951 |
| 2,568,721 | Deloraine | Sept. 25, 1951 |
| 2,596,199 | Bennett | May 13, 1952 |
| 2,605,361 | Cutler | July 29, 1952 |